United States Patent
Bichot et al.

(10) Patent No.: US 7,761,048 B2
(45) Date of Patent: Jul. 20, 2010

(54) TECHNIQUE FOR VIDEO BROADCASTING IN WIRELESS LAN

(75) Inventors: Guillaume Bichot, Princeton, NJ (US); Kumar Ramaswamy, Princeton, NJ (US); Junbiao Zhang, Bridgewater, NJ (US); Charles Chuanming Wang, Jamison, PA (US)

(73) Assignee: Thomson Licensing, Boulogne-Billancourt (FR)

( * ) Notice: Subject to any disclaimer, the term of this patent is extended or adjusted under 35 U.S.C. 154(b) by 325 days.

(21) Appl. No.: 10/564,253

(22) PCT Filed: Jul. 14, 2003

(86) PCT No.: PCT/US03/21727
§ 371 (c)(1), (2), (4) Date: Jan. 10, 2006

(87) PCT Pub. No.: WO2005/018119
PCT Pub. Date: Feb. 24, 2005

(65) Prior Publication Data
US 2006/0174288 A1    Aug. 3, 2006

(51) Int. Cl.
*H04H 20/71* (2008.01)
*H04H 40/00* (2008.01)
*H04M 3/42* (2006.01)

(52) U.S. Cl. .............. 455/3.01; 455/466; 455/3.06; 455/414.1

(58) Field of Classification Search ............ 455/3.01, 455/3.06, 3.04, 414.1, 3.02, 3.03, 3.05, 66.1, 455/552.1, 426.1, 344; 725/81
See application file for complete search history.

(56) References Cited

U.S. PATENT DOCUMENTS

| | | | | |
|---|---|---|---|---|
| 5,586,121 A | * | 12/1996 | Moura et al. | 370/404 |
| 5,754,961 A | | 5/1998 | Serizawa et al. | |
| 6,130,885 A | | 10/2000 | Izumi et al. | |
| 6,845,230 B2 | * | 1/2005 | Syed | 455/3.02 |
| 6,889,384 B1 | * | 5/2005 | Soloff | 725/105 |
| 6,925,285 B2 | | 8/2005 | Kim | |
| 7,072,640 B2 | * | 7/2006 | Bernhart | 455/407 |

(Continued)

FOREIGN PATENT DOCUMENTS

JP    7-284156 A    10/1995

(Continued)

OTHER PUBLICATIONS

Search Report.

*Primary Examiner*—Tilahun Gesesse
(74) *Attorney, Agent, or Firm*—Robert D. Shedd; Robert B. Levy; Wan Yee Cheung

(57) ABSTRACT

A wireless Local Area Network provides data service through a data LAN and also provides video broadcast service through a video LAN. A wireless LAN subscriber accesses the video LAN through one of a plurality of Video Access Points (VAPs) that broadcast multiple video programs on a channel having a frequency different than the frequency over which the subscriber accesses the data LAN. Each VAP maintains the video channel in a one-way broadcast-only mode to prevent a wireless LAN subscriber from seeking to uplink information on that channel. In this way, the wireless LAN can employ a common protocol for both data and video transmission, and deliver the video streams at the maximum permissible downlink transmission rate.

14 Claims, 1 Drawing Sheet

U.S. PATENT DOCUMENTS

| | | | |
|---|---|---|---|
| 7,139,594 B2 * | 11/2006 | Nagatomo | 455/566 |
| 7,231,233 B2 * | 6/2007 | Gosieski, Jr. | 455/569.1 |
| 7,236,771 B2 * | 6/2007 | Aaltonen et al. | 455/414.1 |
| 7,423,987 B2 * | 9/2008 | Anderson et al. | 370/316 |
| 7,440,559 B2 * | 10/2008 | Muhonen et al. | 379/201.01 |
| 7,490,341 B2 * | 2/2009 | Kiiskinen et al. | 725/38 |
| 7,606,559 B2 * | 10/2009 | Aarnio et al. | 455/411 |
| 2001/0053700 A1 * | 12/2001 | Sibley | 455/517 |
| 2002/0080753 A1 | 6/2002 | Lee | |
| 2002/0163933 A1 | 11/2002 | Benveniste | |
| 2003/0037033 A1 | 2/2003 | Nyman et al. | |
| 2003/0064679 A1 | 4/2003 | Kim | |
| 2003/0092376 A1 * | 5/2003 | Syed | 455/3.06 |
| 2003/0174690 A1 * | 9/2003 | Benveniste | 370/350 |
| 2004/0044784 A1 * | 3/2004 | Hirano | 709/232 |
| 2004/0071354 A1 * | 4/2004 | Adachi et al. | 382/236 |
| 2004/0095911 A1 | 5/2004 | Benveniste et al. | |
| 2004/0125779 A1 * | 7/2004 | Kelton et al. | 370/338 |
| 2004/0223747 A1 * | 11/2004 | Otala et al. | 386/125 |
| 2005/0097624 A1 * | 5/2005 | Salo et al. | 725/136 |

FOREIGN PATENT DOCUMENTS

| | | |
|---|---|---|
| JP | 8-265231 A | 10/1996 |
| JP | 8-331153 A | 12/1996 |
| JP | 2000-022703 A | 1/2000 |
| JP | 2002-271340 | 9/2002 |
| KR | 2003-0027467 | 4/2003 |
| WO | WO0213429 A1 | 2/2002 |

* cited by examiner

TECHNIQUE FOR VIDEO BROADCASTING IN WIRELESS LAN

This application claims the benefit, under 35 U.S.C. §365 of International Application PCT/US03/021727, filed Jul. 14, 2003, which was published in accordance with PCT Article 21(2) on Feb. 24, 2005 in English.

TECHNICAL FIELD

This invention relates to a technique for enabling a wireless Local Area Network (LAN) subscriber to acquire video from the wireless LAN.

BACKGROUND ART

Advances in the field of wireless LAN technology have resulted in the emergence of publicly accessible wireless LANs (e.g., "hot spots") at rest stops, cafes, libraries and similar public facilities. Presently, wireless LANs offer mobile wireless communications device users access to a private data network, such as a Corporate Intranet, or a public data network such as the Internet. The relatively low cost to implement and operate a wireless LAN, as well as the available high bandwidth (usually in excess of 10 Megabits/second) makes the wireless LAN an ideal access mechanism through which mobile wireless communications device users can exchange packets with an external entity.

For the most part, those who seek access to a wireless LAN do so for the purpose of accessing a network of interconnected computers, such as the Internet, a Wide Area Network (WAN) or corporate Intranet. By accessing such a network, a wireless LAN subscriber can obtain not only text files but also multimedia files, including streaming video. Providing video over a large network of interconnected computers such as the Internet remains a relatively complex undertaking because the process is usually linked with IP multicasting and Internet quality of service issues.

Thus, there is need for a technique for providing video (including embedded audio information) to wireless LAN subscribers that overcomes the aforementioned disadvantage.

BRIEF SUMMARY OF THE INVENTION

Briefly, in accordance with a preferred embodiment of the present principles, video (including embedded audio) is provided to subscribers in a wireless network over a dedicated Radio Frequency (RF) data carrier distinct from the carrier(s) used for other data services. Initially, the wireless LAN receives video from one or more sources. The received video is then encoded into at least one prescribed format. The encoded video is then broadcast by one or more Access Points (APs) over a video channel on Radio Frequency (RF) data carrier distinct from the data carrier(s) of the channel(s) in the wireless LAN over which IP data is transmitted. While the video is broadcast over the video channel, the exclusivity of that channel is maintained for one-way transmission by precluding any wireless LAN subscriber from attempting to transmit over the video channel. Since both the mobile-to-AP uplink path and AP-to-mobile downlink path share the same fixed radio frequency bandwidth, maintaining the video channel in a one-way broadcast-only mode enables the use of conventional wireless LAN technology to transmit video to wireless LAN subscribers at the maximum permissible downlink transmission rate.

DETAILED DESCRIPTION

Figure 1:
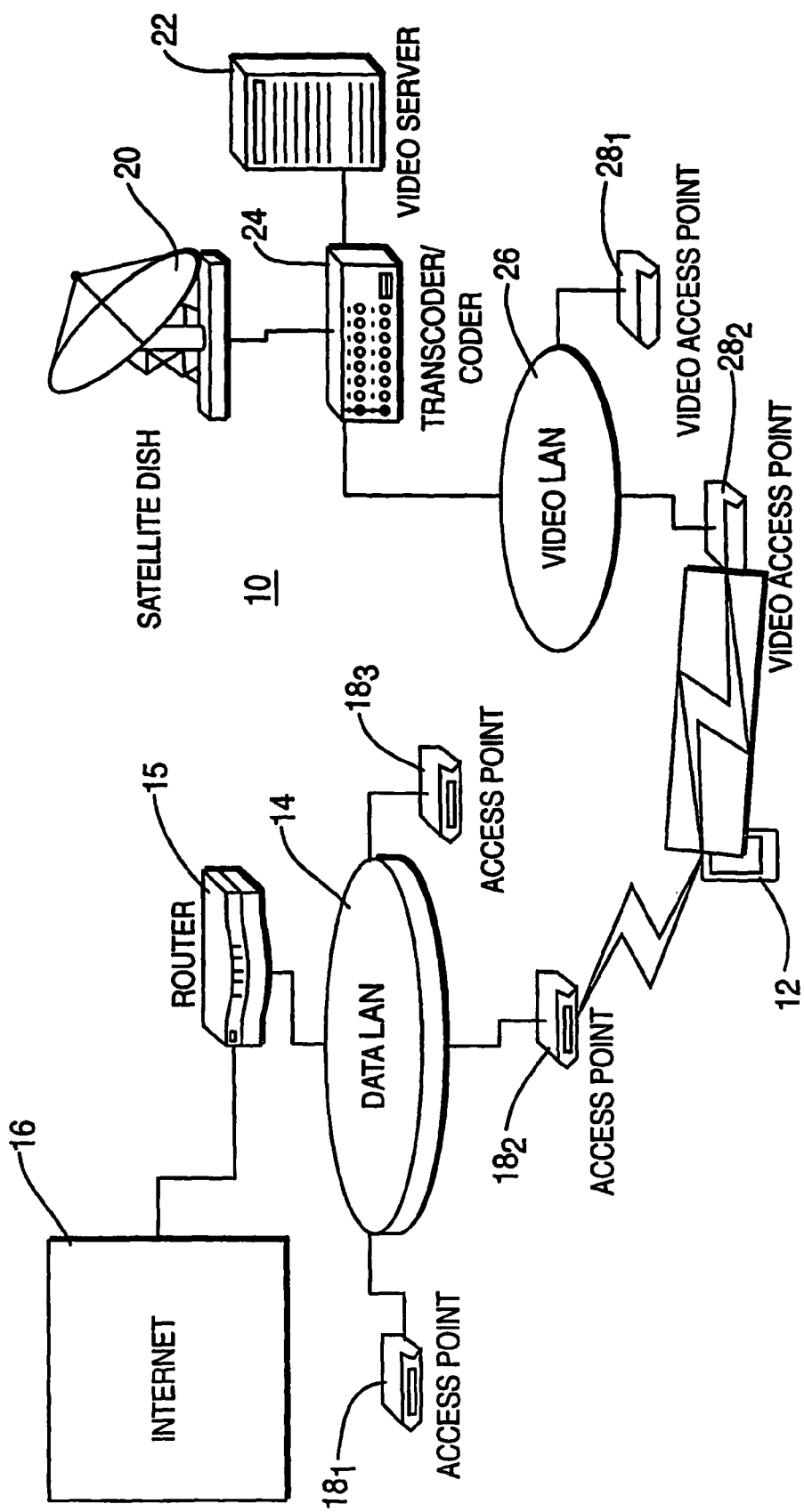
FIG. 1 illustrates a block schematic diagram of a wireless LAN network that provides video broadcast service in accordance with the present principles.

FIG. 1 depicts a block schematic diagram of a wireless Local Area Network (LAN) 10 for providing both data access and video broadcast service to a wireless LAN subscriber who accesses the wireless LAN through a mobile wireless communications device 12, illustratively depicted as a personal data assistant (PDA). In addition to, or in place of the PDA 12, subscribers can access the wireless LAN 10 through other mobile wireless communications devices (not shown), such as a wireless telephone handset, or a lap top computer that includes a wireless modem or wireless network card.

The wireless network 10 includes a data LAN 14 connected through a router 15 to a network of interconnected computers 16, such as the Internet. Alternatively, the network of interconnected computers 16 could comprise a Wide Area Network (WAN) or a corporate intranet. Each of a plurality of access points (APs), exemplified by APs $18_1$, $18_2$ and $18_3$, provides access to the data LAN 14 by a wireless subscriber through the PDA 12 or other type of mobile wireless communications device. In this regard, each of the APs $18_1$, $18_2$ and $18_3$ includes a radio transceiver (not shown) for transmitting signals to, and receiving signals from each mobile wireless communications device seeking to establish a communications session with the data LAN 16. To facilitate such wireless communication, each of the APs $18_1$, $18_2$ and $18_3$ will typically utilize one or more well-known wireless LAN protocols, such as the IEEE 802.11 and ETSI Hiperlan2 protocols.

In addition to providing data access, the wireless LAN 10 provides a video broadcast service whereby subscribers of the wireless LAN can obtain video information that includes embedded audio as well. To that end, the wireless LAN 10 includes one or more video sources, exemplified by satellite dish 20 for receiving off-air video, and a video server 22 for providing one or more video files (and associated audio files as well) stored in a digital format. Additional video sources (not shown) could include live video as well as one or more analog or digital playback devices. A transcoder/coder 24 transcodes the video (and embedded audio when present) into one suitable formats such as MPEG 2 or JVT (MPEG 4 part 10/H.264) and broadcasts it over the WLAN 26 employing a standard transport format that can be Ethernet or IP-over-Ethernet or RTP-over-UDP-over-IP or any other adapted format.

The encoded video from the transcoder/coder 24 is received in a video LAN 26 accessed by a mobile wireless communications device, such as PDA 12, through one or more Video Access Points (VAPs), best exemplified by VAPs $28_1$ and $28_2$. Each of the VAPs $28_1$ and $28_2$ comprises a transmitter for transmitting the encoded video (and embedded audio when present) on a video channel having a frequency different than the frequency of the channel(s) utilized by the transceiver within each of the APs $18_1$-$18_3$ to broadcast and receive IP data. To facilitate access by the PDA 12 and other types of mobile wireless communications devices, the VAPs $28_1$ and $28_1$ will typically make use of the same wireless LAN protocol as each of the APs $18_1$-$18_3$. Thus, for example, the VAPs $28_1$ and $28_2$ will typically employ one or both of the IEEE 802.11 and ETSI Hiperlan 2 protocols.

Utilizing one or both of the IEEE 802.11 and ETSI Hiperlan 2 protocols will greatly simplify the interface employed by each mobile wireless communications device that downloads data and video. However, using each of these well-known protocols in their conventional form can incur difficulties with respect to the video broadcast service provided by the video LAN 26 as each protocol requires a nearly synchronous transport service. To facilitate access by a wireless LAN subscriber to the data LAN 14, the IEEE 802.11 and ETSI Hiperlan 2 protocols provide for both downlink and uplink capability. However, providing the capability within a mobile wireless communication device to uplink to one of the VAPs $28_1$ and $28_2$ is undesirable. Any attempt by a mobile wireless communications device to uplink data to one of the VAPs $28_1$ and $28_2$ will reduce the pseudo synchronous service ability of the VAPs to downlink video to other mobile wireless communications devices. Therefore, in accordance with the present principles, the VAPs $28_1$ and $28_2$ specifically preclude each mobile communications device from transmitting data thereto. The following discussion addresses the manner in which such data uplinking is precluded for each of the IEEE 802.11 and ETSI Hiperlan2 protocols.

IEEE 802.11

The IEEE 802.11 protocol employs CSMA/CA (Collision Sense Multiple Access/Collision Avoidance) utilizing a distributed Medium Access Control (MAC) mechanism whereby all mobile wireless communications devices and access points have the same right/chance to acquire the channel. One approach to enable each of the VAPs $28_1$ and $28_2$ to permanently grab the channel is to modify the Network Allocation Vector (NAV) in the header of each frame of video information broadcast by each VAP. The NAV specifies the time when the current exchange of data should end. To avoid a possible collision, the mobile wireless communication device will read this information in the NAV and will not try to acquire the channel before this time has elapsed. Thus, by modifying the NAV in the frames broadcast by each VAP to provide a maximum time, the VAP can preclude each mobile wireless communications device uplinking data on the channel carrying video.

ETSI/Hiperlan2

The ETSI/Hiperlan2 protocol embodies a centralized Medium Access Control (MAC) in which the access point (AP) serves as the central controller. As discussed below, the ETSI/Hiperlan2 can cope with isosynchronous transmission without any change. With the ETSI/Hiperlan2 protocol, the AP can guaranty nearly exclusive usage of the channel. According to the specification of this protocol, the AP decides and informs the mobile wireless communications device about the structure of the MAC frame, which includes a part reserved to the Random Channel. The Random Channel is a time slot during which any mobile wireless communication device can gain access according to a distributed random access algorithm (e.g., CSMA). The AP has the obligation to maintain at least a 9 byte-wide time slot for this random channel. The 9 byte-wide time slot can be as long as 12 μs for a worst-case scenario (BPSK modulation) or as short as 0.25 ns for a best-case scenario (64-bit QAM). One solution is to remove this restriction and simply drop the random channel. The resultant jitter is typically within the tolerance limits for some popular video transport formats such as the MPEG 2 Transport Stream format.

Taking into account the previous considerations a mobile wireless communications device, such as the PDA 12, can exchange IP data or receive video broadcast service using the same wireless transceiver. In practice, many present-day mobile wireless communications devices support a single wireless protocol, (e.g., either IEEE 802.11 or ETSI/Hiperlan2). However, advances in current technology will likely give rise mobile wireless communications devices that support two or more different protocols, thus enabling the data AP 18 and the VAP 28 to support different such technologies.

In order to cover the entire geographic area encompassed by the wireless LAN 10, it might be necessary to have a set of access points inter-connected together. Frequency planning then becomes necessary in order to avoid (or limit) overlapping of radio bands. Three different frequency channels are available with IEEE 802.11b and thus it is possible to use two channels for the Data LAN 14 and the remaining channel for video broadcasting. For the 5 GHz. radio techniques like IEEE 802.11a and ETSI Hiperlan2, eight channels are typically available, allowing for easier frequency planning.

In order to simplify installation and to limit costs, the wireless LAN 10 could employ downlink repeaters (not shown) to repeat the video broadcasts. Such repeaters would operate in the radio domain and repeat the video broadcast by one of the VAPs $28_1$ and $28_2$. The repeated signal can be transposed in another frequency band in order to limit the multi-path effect. Directional (multi beams) antenna can also be used.

To support video broadcast service available in the wireless LAN 10, each mobile wireless communications device, such as PDA 12, needs to support the following functionalities.

Network Switching:

While associated with the data wireless LAN 14, the mobile wireless communications device should possess the ability to initiate selection of the video LAN 26 upon user action (menu or button selection). The mobile wireless communications identifies the video LAN 26 according to the System ID (IEEE 802.11 ESSID or ETSI Hiperlan2 OPID) present in the header of the beacon frame broadcast by the VAPs $28_1$ and $28_2$. While receiving a video broadcast from a video LAN 26, the mobile wireless communications device also should possess the ability to initiate selection of the data LAN 14 upon a user action (menu or button selection). The mobile wireless communication device selects the data LAN 14 according to the system ID of the data LAN saved before switching to the video LAN.

Packet Snooping:

In the video broadcast mode, the mobile wireless communications device does not associate itself with any of the VAPs $28_1$-$28_2$. Thus, the mobile wireless communications device, once switched to the video LAN 26, will listen to the broadcast video without trying to associate with the VAP. The mobile wireless communications device will set up different protocol layers with a minimum static configuration (no DHCP). Depending on the nature of the mobile wireless communications device and the format of the video information being transmitted, one or more VAPs could multicast several video streams in parallel, each with a different profile/level in order to cope with the different possible types of mobile wireless communications devices seeking the video broadcast service.

The foregoing describes a technique for enabling a subscriber to exchange data as well as to acquire video from a wireless LAN.

The invention claimed is:

1. A method for providing video to at least one subscriber in a wireless Local Area Network (LAN) comprising the steps of receiving video from at least one source, encoding the video into at least one prescribed format;

broadcasting the video on a video channel having an RF carrier frequency different from a carrier frequency of a wireless data channel over which data is transmitted to and from an access point, wherein the video channel provides both downlink and uplink capability; and maintaining the video channel in a one-way broadcast-only mode at least while the video channel carries video, thereby precluding a subscriber from uplinking information on the video channel.

2. The method according to claim 1 wherein wireless LAN utilizes at least one of the IEEE 802.11 and ETSI/Hiperlan2 protocols and wherein the broadcast-only mode of the video channel is maintained by adjusting at least one parameter specified by the at least one protocol.

3. The method according to claim 1 wherein the wireless LAN utilizes the IEEE 802.11 protocol and wherein the broadcast-only mode of the video channel is maintained by adjusting at a wireless access point a Network Allocation Vector (NAV) present in frames carrying the broadcasted video.

4. The method according to claim 1 wherein the wireless LAN utilizes the ETSI/Hiperlan2 protocol and wherein the broadcast-only mode of the video channel is maintained by removing access to a Random Channel.

5. The method according to claim 1 wherein the video is received from multiple sources.

6. The method according to claim 1 wherein the video is encoded in accordance with one of the MPEG 2 and JVT (MPEG 4 part 10/H.264) formats.

7. Apparatus for providing video to at least one subscriber in a wireless Local Area Network (LAN) comprising of
a receiver for receiving video from at least one source,
an encoder for encoding the video from the receiver into at least one prescribed format;
a video broadcast network for broadcasting the video from the encoder on a video channel having a frequency different from a wireless data channel over which data is broadcast from an access point, wherein the video channel provides both downlink and uplink capability, while maintaining the video channel in a broadcast-only mode, thereby precluding a subscriber from uplinking information on the video channel.

8. The apparatus according to claim 7 wherein the video broadcast system comprises:
a video Local Area Network (LAN) connected to encoder; and
at least one Video Access Point (VAP) connected to the Video LAN for broadcasting the video carried by the video LAN from the encoder and for maintaining the video channel in the broadcast-only mode.

9. The apparatus according to claim 8 wherein the at least one VAP utilizes at least one of the IEEE 802.11 and ETSI/Hiperlan2 protocols and wherein the VAP maintains the broadcast-only mode of the video channel by adjusting at least one parameter of the broadcasted video in accordance with the at least one protocol.

10. The apparatus according to claim 8 wherein the at least one VAP utilizes the IEEE 802.11 protocol and wherein the VAP maintains the broadcast-only mode of the video channel by adjusting a Network Allocation Vector (NAV) present in frames carrying the broadcasted video.

11. The apparatus according to claim 8 wherein the VAP utilizes the ETSI/Hiperlan2 protocol and wherein the VAP maintains the broadcast-only mode of the video channel by removing a Random Channel.

12. The apparatus according to claim 7 wherein the encoder encodes the video in accordance with one of the MPEG 2 and JVT (MPEG 4 part 10/H.264) formats.

13. A method for receiving broadcast video at a mobile wireless communications device, comprising the steps of:
initiating selection of a video Local Area Network (LAN) upon user actuation of the device, wherein the video LAN provides both downlink and uplink capability; and
detecting transmission of the video broadcast from video LAN without trying to uplink traffic to said video LAN; and
providing a bi-directional wireless data channel for a data LAN separate and distinct from the video LAN and in communication with the mobile communication device.

14. The method according to claim 13 further comprising the step of setting up different protocol layers with a minimum static configuration within the mobile wireless communication device.

* * * * *